(12) United States Patent
Potier et al.

(10) Patent No.: US 11,493,084 B2
(45) Date of Patent: *Nov. 8, 2022

(54) TRUNNION MOUNT FOR MOUNTING AN ENGINE

(71) Applicant: Liebherr-Components Colmar SAS, Colmar (FR)

(72) Inventors: Benjamin Potier, Colmar (FR); Thierry Bindner, Strasbourg (FR)

(73) Assignee: Liebherr-Components Colmar SAS, Colmar (FR)

( * ) Notice: Subject to any disclaimer, the term of this patent is extended or adjusted under 35 U.S.C. 154(b) by 220 days.

This patent is subject to a terminal disclaimer.

(21) Appl. No.: 16/578,185

(22) Filed: Sep. 20, 2019

(65) Prior Publication Data

US 2020/0158164 A1    May 21, 2020

(30) Foreign Application Priority Data

Nov. 16, 2018   (DE) ...................... 10 2018 128 852.2

(51) Int. Cl.
| | | |
|---|---|---|
| *F16C 17/20* | (2006.01) | |
| *B60K 5/12* | (2006.01) | |
| *F16C 3/06* | (2006.01) | |

(52) U.S. Cl.
CPC ............ *F16C 17/20* (2013.01); *B60K 5/1225* (2013.01); *B60K 5/1275* (2013.01); *F16C 3/06* (2013.01)

(58) Field of Classification Search
CPC ..... B60K 5/1216; B60K 5/1225; F16C 33/22; F16C 17/20; F16C 3/06; F16C 9/00;
(Continued)

(56) References Cited

U.S. PATENT DOCUMENTS 1,701,396 A * 2/1929 Summers .................. F16F 3/10
                                                           248/568
1,831,628 A    11/1931 Kuenzel
(Continued)

FOREIGN PATENT DOCUMENTS

AU          145221      2/1952
CN       105818666 A    8/2016
(Continued)

OTHER PUBLICATIONS

European Patent Office, Office Action Issued in Application No. 19198600.9, dated Apr. 15, 2021, Germany, 7 pages.
(Continued)

*Primary Examiner* — Kimberly T Wood
(74) *Attorney, Agent, or Firm* — McCoy Russell LLP

(57) ABSTRACT

A trunnion mount for mounting an engine to a chassis. A support element fixedly connected and/or connectable to the engine and having a ring portion with an outer bearing surface that is arranged concentrically around the crankshaft of the engine. A shelf having an inner bearing surface for surrounding the outer bearing surface of the support element. The shelf forming the link between the chassis and the engine. A rubber bearing arranged between the inner bearing surface of the shelf and the outer bearing surface of the support element. The trunnion mount is characterized in that the rubber bearing is axially press-fitted on the outer bearing surface of the support element.

19 Claims, 3 Drawing Sheets

(58) Field of Classification Search
CPC ........ F16C 9/02; F16C 9/03; B60Y 2200/142; B60Y 2200/412; B60Y 2200/41
USPC .......................................................... 248/659
See application file for complete search history.

(56) References Cited

U.S. PATENT DOCUMENTS

| | | | | |
|---|---|---|---|---|
| 1,975,810 | A * | 10/1934 | Trott | B60K 5/1225 180/300 |
| 1,975,910 | A * | 10/1934 | Trott | B60K 5/1216 180/300 |
| 2,251,398 | A * | 8/1941 | Clark | B60K 5/1225 248/606 |
| 2,258,420 | A * | 10/1941 | Piron | F16C 33/22 384/125 |
| 2,267,312 | A * | 12/1941 | Downie | F16F 1/38 267/282 |
| 2,282,174 | A * | 5/1942 | Else | H02K 5/24 248/606 |
| 2,498,126 | A * | 2/1950 | Koch | F16F 1/38 248/606 |
| 2,954,193 | A * | 9/1960 | Loftis | F16F 1/38 248/606 |
| 3,012,743 | A * | 12/1961 | Jenkins | H02K 5/24 248/606 |
| 3,083,065 | A * | 3/1963 | Hinks | F16C 33/24 384/221 |
| 3,135,224 | A * | 6/1964 | McLean | B61C 9/48 105/136 |
| 3,580,532 | A * | 5/1971 | Schmitt | F16C 27/063 248/612 |
| 3,633,856 | A | 1/1972 | Crews | |
| 3,666,301 | A * | 5/1972 | Jorn | F16F 1/387 403/228 |
| 3,685,773 | A * | 8/1972 | Otto | F16F 1/38 248/606 |
| 3,750,267 | A * | 8/1973 | Otto | F16M 1/00 29/507 |
| 3,770,231 | A * | 11/1973 | Kirchgessner | F16F 1/3814 248/612 |
| 4,438,703 | A * | 3/1984 | Eggert, Jr. | B61F 5/305 105/224.1 |
| 4,707,149 | A | 11/1987 | Hahle | |
| 6,321,890 | B1 | 11/2001 | Suzuki et al. | |
| 9,644,697 | B2 * | 5/2017 | Mitsch | F16F 1/187 |
| 2017/0023171 | A1 * | 1/2017 | Khan | B65D 85/68 |
| 2020/0156453 | A1 | 5/2020 | Bindner et al. | |

FOREIGN PATENT DOCUMENTS

| | | | |
|---|---|---|---|
| DE | 2030984 | A1 | 1/1971 |
| DE | 3531340 | A1 | 3/1987 |
| DE | 102006019264 | A1 | 10/2007 |
| DE | 112014005227 | T5 | 8/2016 |
| EP | 2711223 | A1 | 3/2014 |
| FR | 726769 | A | 6/1932 |
| FR | 2872874 | A1 * | 1/2006 ............. F16C 35/02 |
| JP | H0917635 | A | 6/1997 |
| JP | 2014214847 | A | 11/2014 |

OTHER PUBLICATIONS

European Patent Office, Extended European Search Report Issued in Application No. 19198600.9, dated Apr. 28, 2020, Germany, 9 pages.

European Patent Office, Extended European Search Report Issued in Application No. 19198548.0, dated Apr. 22, 2020, Germany, 23 pages.

European Patent Office, Office Action Issued in Application No. 19198548.0, dated Mar. 19, 2021, Germany, 7 pages.

* cited by examiner

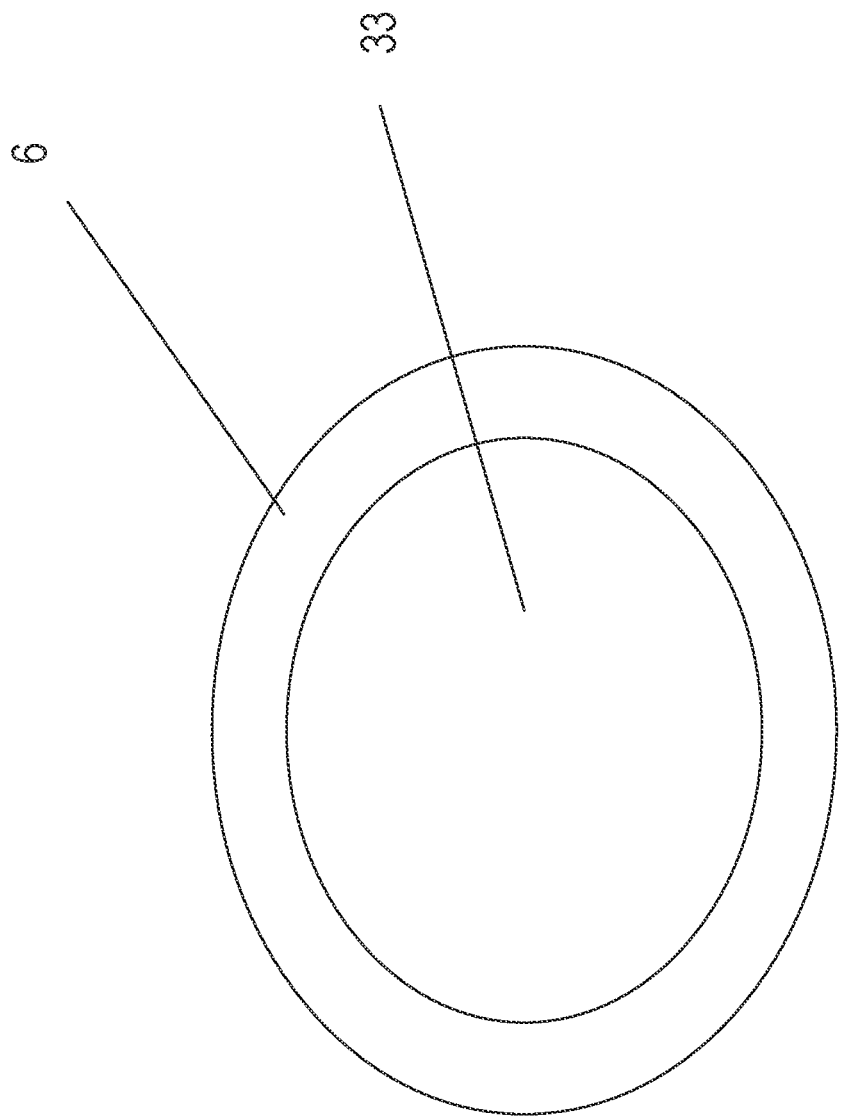

TRUNNION MOUNT FOR MOUNTING AN ENGINE

CROSS REFERENCE TO RELATED APPLICATION

The present application claims priority to German Application No. DE 10 2018 128 852.2 entitled "TRUNNION MOUNT FOR MOUNTING AN ENGINE," filed on Nov. 16, 2018. The entire contents of the above listed application are hereby incorporated by reference for all purposes.

TECHNICAL FIELD

The present application is directed generally to mounts for mounting an engine to a chassis.

BACKGROUND AND SUMMARY

An embodiment of the trunnion mount comprises a support element fixedly connected and/or connectable to the engine and having a ring portion with an outer bearing surface, a shelf having an inner bearing surface for surrounding the bearing surface of the support element, the shelf forming the link between the chassis and the engine, and a bearing element arranged between the inner bearing surface of the shelf and the outer bearing surface.

Such trunnion mounts are used to increase the stability of the engine mount in its environment, minimize deformation energy coming from the chassis of the machine (such as loading under torsion) and transmitted to the engine block, and minimize deformation energy coming from the engine block (such as loading by accelerations, vibrations and thermal expansion) transmitted to the chassis of the machine. This function is achieved because the trunnion mount provides damping and degrees of freedom between the chassis and the engine block around the crankshaft axis and in engine axial direction.

US 2017/0023171 A1 shows a trunnion mount for an engine used in a transport stand for transporting different types of engines.

In one type of known trunnion mounts a metal bearing element is used. This type of bearing however needs external lubrication and therefore an external lubrication circuit to guarantee good lubrication conditions. Further, during operation, corrosion may appear and finally block the relative movement between the relative parts when lubrication is not properly ensured.

In a second type of known trunnion mounts, a rubber bearing composed of two separate elements each forming a half circle is used. Each part is composed of two layers of sheet metal and an intermediate layer of rubber. The two bearing half circles are compressed by two half shelves assembled around the rubber bearing and tightened together by screws. Further, two side pins are used for securing the rubber bearing in its position. The major drawback of this solution is that proper contact between the ring portion of the support element and the metal sheet of the rubber bearing is only provided by the pressure created by the screws, and that local contact between the side pins and the bearing creates shear stress which can lead to cracks.

An object of the present application is therefore to provide an improved trunnion mount.

The present application comprises an embodiment of the trunnion mount for mounting an engine to a chassis, comprising a support element fixedly connected and/or connectable to the engine and having a ring portion with an outer bearing surface, a shelf having an inner bearing surface for surrounding the bearing surface of the support element, the shelf forming the link between the chassis and the engine, and a rubber bearing arranged between the inner bearing surface of the shelf and the outer bearing surface.

An embodiment of the trunnion mount is characterized in that the rubber bearing is axially press-fitted on the outer bearing surface of the support element. The axial press fit provides contact around the entire outer bearing surface of the support element. Further, local contact points leading to shearing stresses are avoided.

In an embodiment of the present application, the outer bearing surface of the ring portion is arranged concentrically around the crankshaft of the engine. In an embodiment, the crankshaft may extend through the ring portion.

In an embodiment of the present application, the rubber bearing is a ring element that is press-fitted onto the outer bearing surface of the ring portion of the support element with its inner surface. The inner surface extends uninterrupted in the circumferential direction.

In an embodiment of the present application, the inner bearing surface and/or the outer bearing surface has at least a cylindrical part. In particular, the inner bearing surface and/or the outer bearing surface may be cylindrical.

In an alternative embodiment, the inner bearing surface may have a profile in the axial direction, for example in order to increase the connectivity with the rubber bearing and/or to center the rubber bearing in an axial direction.

In an embodiment of the present application, the rubber bearing comprises an inner metal layer, wherein the rubber bearing is press-fitted onto the outer bearing surface of the support element with the inner metal layer. The metal layer provides both stiffness to the rubber bearing, and the axial fit with the outer bearing surface.

In an embodiment of the present application, the inner metal layer is formed by a metal sheet. An embodiment of the metal sheet is in direct contact with the bearing surface of the support element.

In an embodiment of the present application, the inner metal layer is formed by a cylindrical metal sheet.

In an embodiment of the present application, the metal sheet is formed as a continuous metal band in the circumferential direction. It therefore surrounds the bearing surface of the support element around its entire circumference and provides the necessary rigidity for a press fit having high contact pressure.

In an embodiment of the present application, the rubber bearing comprises at least one rubber layer and/or at least one outer metal layer. An embodiment of the rubber layer is arranged between two metal layers for providing stiffness.

In an embodiment of the present application, the rubber layer and/or at least one outer metal layer have at least one slit extending from a first axial side to a second axial side. The slit allows a compression of the rubber layer.

In an embodiment of the present application, the rubber bearing comprises two rubber layers, a middle metal layer arranged between the two rubber layers, and an inner and an outer metal layer.

In an embodiment of the present application, the rubber layers and/or the middle metal layer and/or the outer metal layer have at least one slit extending from a first axial side to a second axial side. In an embodiment, all the slits are arranged in the same radial position. Further, in an embodiment of the present application, the inner metal layer is formed as a continuous metal band in the circumferential direction and therefore does not have a slit extending from a first axial side to a second axial side. The inner metal layer thereby ensure a high contact pressure and secure connection to the outer bearing surface of the ring portion, while the remaining layers allow compression of the rubber layers due to the slit.

In an alternative embodiment, the rubber bearing comprises an inner rubber layer that is in contact with the outer bearing surface of the support element. The inner rubber layer may be provided with a slit extending from a first axial side to a second axial side, or may be continuous in the circumferential direction.

Further, the rubber bearing may comprise an outer rubber layer that is in contact with the inner bearing surface of the shelf. Alternatively, the rubber bearing may comprise an outer metal layer that is in contact with the inner bearing surface of the shelf. The outer rubber or metal layer may be provided with a slit extending from a first axial side to a second axial side, or may be continuous in the circumferential direction.

Further, the rubber bearing may comprise a middle metal layer arranged between the inner and the outer rubber layer. An embodiment of the middle metal layer is formed by a continuous metal band.

In an embodiment of the present application, the rubber bearing comprises an axial stop member for abutting with an axial end of the ring portion of the support member. The axial stop member therefore limits the axial press fit motion and/or defines the axial position of the rubber bearing on the ring portion of the support member.

In an embodiment of the present application, the axial stop member is formed by a metal ring plate connected to the inner metal layer of the rubber bearing. In particular, the axial stop member can be formed integrally with the inner metal layer or may be welded or glued to the inner metal layer.

In an embodiment of the present application, the axial stop member is connected to the axial end of the ring portion of the support member via screws.

In an embodiment of the present application, the rubber bearing is formed separately from the support element and the shelf.

An embodiment of the rubber bearing is formed as a bearing ring formed separately from the support element and the shelf and disposed between the support element and the shelf on mounting of the trunnion mount.

In an embodiment of the present application, the shelf has a lower half shelf comprising a part of the inner bearing surface on its upper surface and an upper half shelf comprising a part of the inner bearing surface on its lower surface. This construction allows a simple mounting of the trunnion mount and a compression of the rubber bearing between the two half shelves and the ring portion.

In an embodiment of the present application, the upper half shelf is connected and/or connectable to the lower half shelf via one or more screws. In particular, the screws extend in a direction that is perpendicular to the axial direction of the engine. An embodiment of the screws extend in a vertical direction.

In an embodiment of the present application, the lower half shelf comprises mounting pads for mounting the shelf to a chassis. An embodiment of the lower half shelf is formed integrally with the mounting pads.

In an embodiment of the present application, the support element comprises a support plate extending in a direction perpendicular to the axial direction of the engine, and is connected and/or connectable to the engine casing via screws.

In an embodiment of the present application, the ring portion extends in an axial direction from the support plate.

In an embodiment of the present application, the ring portion and the support plate are formed integrally.

The present application further comprises an apparatus comprising a chassis and an engine, wherein the engine is connected to the chassis by at least one trunnion mount.

In an embodiment of the present application, the engine is connected to the chassis by a trunnion mount as described above on both axial sides of the engine.

In an alternative embodiment of the present application, the engine is connected to the chassis by a trunnion mount as described above on one axial side of the engine only, and a different type of mount is used for connecting the engine to the chassis on the other side.

In an embodiment of the present application, the apparatus is a mobile working machine. For example, the apparatus is an earth moving machine such as an excavator and/or a dumper truck.

In an embodiment of the present application, the apparatus is a stationary machine, for example for generation of electricity. In particular, the engine may be connected to a generator for generation of electricity.

In an embodiment of the present application, the engine is a combustion engine, in particular a Diesel or Otto engine.

The present application further comprises a method for mounting an engine, in particular a combustion engine, to a chassis via a trunnion mount as described above. The method comprises the step of axially press-fitting the rubber bearing on the bearing surface of the support element.

In an embodiment of the present application, after the axial press-fitting, an axial stop of the rubber bearing abuts with an axial end face of the ring portion of the support member, and may be connected thereto by screws.

In an embodiment of the present application, the method comprises the further step of connecting, after axially press-fitting the rubber bearing to the support element, the engine via the ring portion of the support element to the shelf.

In an embodiment of the present application, the ring portion and the rubber bearing are compressed between a lower and an upper half shelf.

In an embodiment of the present application, the method comprises the step of connecting the support element to an engine casing, possibly via screws.

In a first embodiment of the present application, the support element is connected to the engine casing before the rubber bearing is axially press-fitted to the ring portion.

In a second embodiment of the present application, the support element is connected to the engine casing after the rubber bearing is axially press-fitted to the ring portion. An embodiment of the support element is connected to the engine casing before the ring portion is mounted on the shelf.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF FIGURES

FIG. 3 depicts a cross-section of an outer bearing surface of a ring element arranged concentrically a crankshaft.

DETAILED DESCRIPTION

Figure 1:
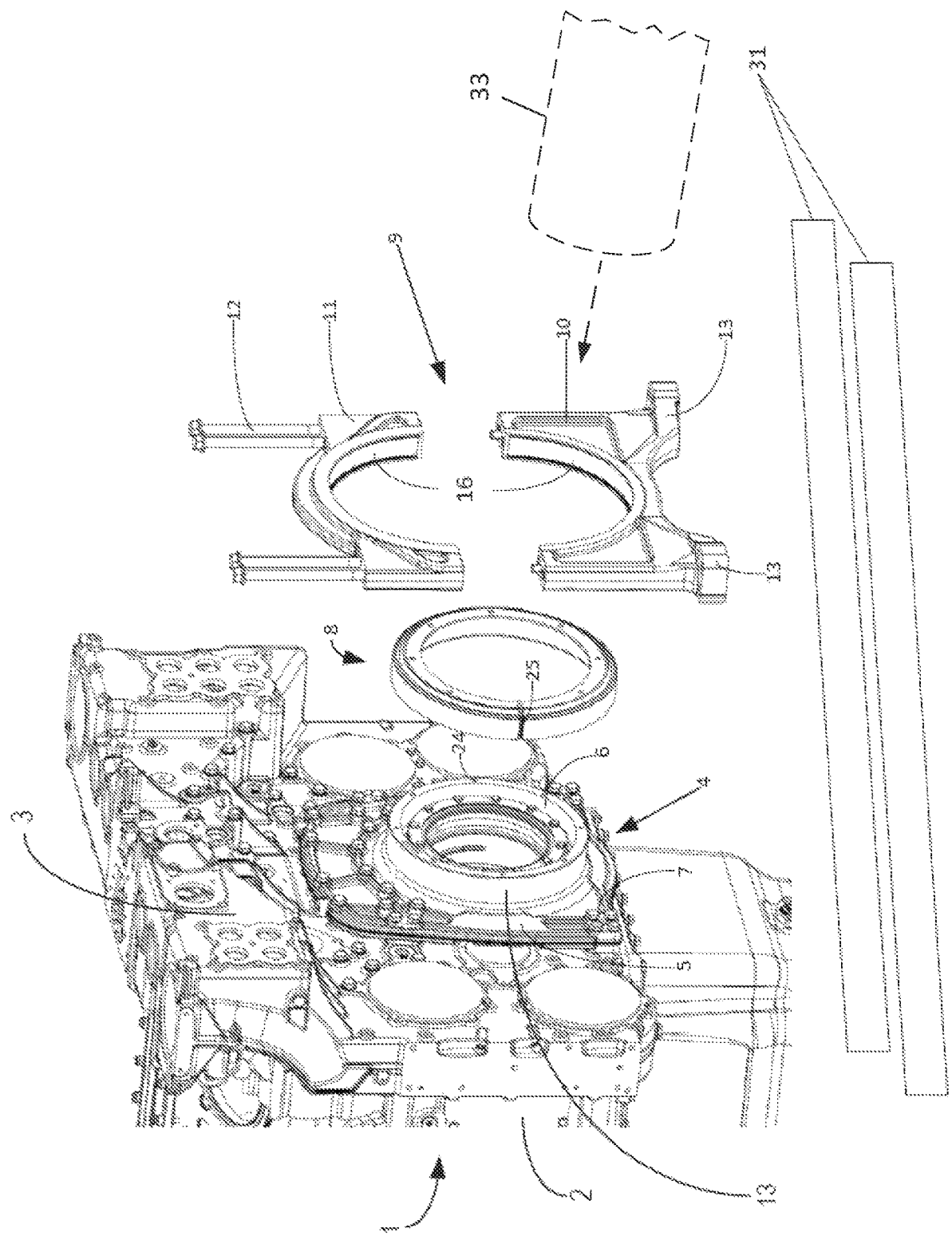
FIG. 1 depicts an exploded view of an embodiment of a trunnion mount according to the present application.

FIG. 1 shows an embodiment of a trunnion mount for an engine 1 to a chassis via a support element 4, a rubber bearing 8 and a shelf 9, with the shelf 9 forming the link between the chassis and the engine 1.

According to an embodiment of the present application, the support element has a ring portion 6 providing an outer bearing surface 13, onto which the rubber bearing is axially press-fitted. In the embodiment, the outer bearing surface 13 is cylindrical.

Further, the shelf 9 has an inner bearing surface 16 for surrounding the outer bearing surface 13 of the support element 4, with the rubber bearing 8 arranged between the inner bearing surface 16 of the shelf 9 and the outer bearing surface 13 of the ring portion 6 in the assembled state.

An advantage of the present application is the axial fitting operation between rubber bearing 8 and the bearing support 4. It ensures contact pressure all around the rubber bearing.

In the embodiment, the rubber bearing 8 is a separate element press-fitted onto the ring portion 6 and mounted in the shelf 9.

Figure 2:
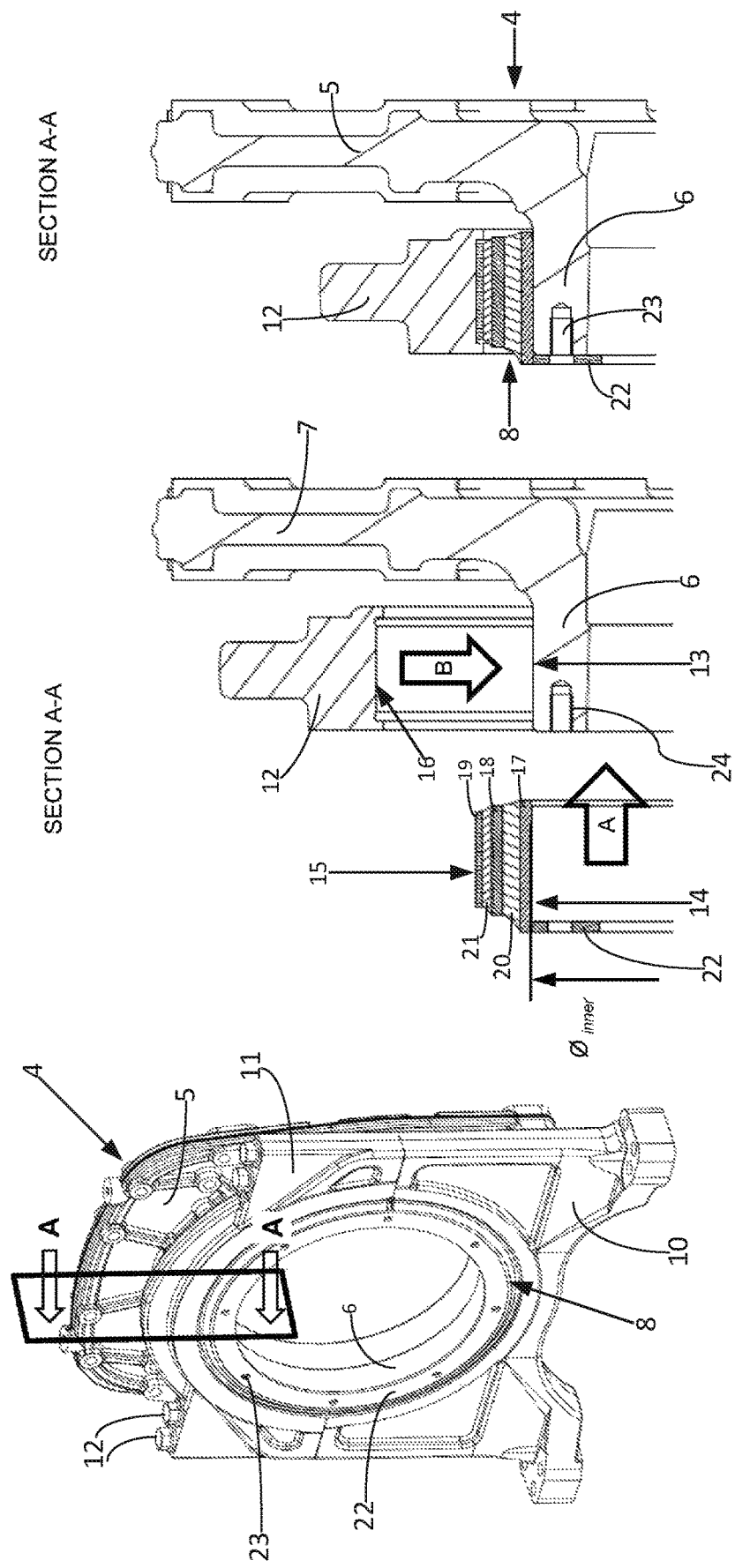
FIG. 2 depicts a perspective view of the embodiment of the trunnion mount in an assembled state and two cut views along a plane extending in an axial and radial direction, showing two steps of an embodiment of a method for assembling the trunnion mount and a final assembled state.

In the embodiment, as shown in the cut views of FIG. 2, the rubber bearing has at least an inner metal layer 17 that is press-fitted onto the ring portion 6. Further, it has at least one rubber layer 20, 21 provided on the inner metal layer 17.

In the embodiment, the rubber bearing 8 further has an outer metal layer 19, such that at least one rubber layer 20, 21 is sandwiched between the inner metal layer 17 and the outer metal layer 19. The inner metal layer 17 provides an inner bearing surface 14 of the rubber bearing 8 that is in contact with the outer bearing surface 13 of the ring portion 6 of the support element 4, and the outer metal layer 19 provides an outer bearing surface 15 in contact with the inner bearing surface of the shelf 9.

In the embodiment, two rubber layers 20, 21 are provided between the inner metal layer 17 and the outer metal layer 19, with a middle metal layer 18 provided between the rubber layers 20, 21.

In an embodiment, all the metal layers are may be made from sheet metal plates, in particular from steel metal plates. The metal layers may be cylindrical.

In the embodiment, the inner metal layer 17 is completely surrounding the ring portion 6 in the circumferential direction in order to provide the press-fit. The rubber layers 20, 21 and the other metal layers 18, 19 of the rubber bearing have an axial slit 25, allowing compression of the rubber layers 20, 21.

In an alternative embodiment, the rubber bearing may comprise an inner rubber layer that is in contact with the outer bearing surface of the support element, a middle metal layer and an outer rubber layer that is in contact with the inner bearing surface of the shelf. An embodiment of the middle metal layer is formed by a continuous metal band. The inner and the outer rubber layers may be provided with a slit extending from a first axial side to a second axial side, or may be continuous in the circumferential direction.

In a further alternative embodiment, the rubber bearing may comprise an inner rubber layer that is in contact with the outer bearing surface of the support element and an outer metal layer that is in contact with the inner bearing surface of the shelf. An embodiment of the outer metal layer is provided with a slit extending from a first axial side to a second axial side. Further, additional middle layers of rubber and/or metal may be provided.

The outer bearing surface of the support element may have a profile in the axial direction for centering the rubber bearing. For example, it may comprise a raised portion at both axial ends of the bearing surface. Further, the inner rubber layer may have tapered axial end portions.

In the embodiment, the shelf 9 is composed of two half shelves 10 and 11. The lower half shelf has mounting pads 13 for mounting the shelf to the chassis 31. The upper half shelf 11 can be mounted on the lower half shelf 10 via screws 12. Tightening of the screws 12 allows compression of the rubber bearing 8 between the ring portion 6 and the two half shelfs. The engine 1 and chassis 31 form part of a mobile assembly machine 101.

Therefore, in more detail, the embodiment of a trunnion mount for an engine 1 shown in FIGS. 1 and 2 consists in the assembly of: a support element 4 rigidly mounted on the engine 1 and having a ring portion 6 acting as shaft receiving a rubber bearing; a rubber bearing 8 composed of successive layers of sheet metal 17, 18 and 19 and rubber 20, 21 (to ensure needed stiffness) axial fitted to the ring portion 6 of the support element 4 on its circular inner layer 17 of sheet metal plate; and two half shelves 10 and 11 finally assembled vertically around the rubber bearing 8 and tightened together by four vertical screws 12 in order to ensure needed rubber compression. Once assembled together, the lower and upper half shelf 10, 11 ensure the link between the chassis of the machine and the engine 1.

The assembly steps shown in FIG. 2 are: axially fitting the rubber bearing on the ring portion 6 of the bearing support 4 and tightening the two half shelves 10 and 11 together.

In the embodiment, the rubber bearing 8 is further provided with an axial stop 22 that abuts with an axial face of the ring portion 6 after the press-fitting. In the embodiment, the axial stop 22 is further secured on the ring portion 6 via screws 23 screwed into screw holes provided in the front surface of the ring portion 6.

In the embodiment, the axial stop 22 is formed by a ring plate made of sheet metal, the ring plate being connected, possibly by welding, to the inner metal plate 17 around its periphery.

In the embodiment, the support element 4 is rigidly mounted on the engine 1 such that the outer bearing surface 13 of the ring element 6 is arranged concentrically to the crankshaft 33 of the engine, as shown in FIG. 1.

In the embodiment, the support element 4 has a mounting plate 5 via which it is connected to the engine 1. The mounting plate extends in a plane perpendicular to the axis of the engine, i.e. the axis of the crankshaft, and is connected to the engine via screws 7. The ring portion 6 extends axially from the mounting plate 5.

In the embodiment, the support element 4 is formed as a cast iron part. The mounting plate 5 and the ring portion 6 are formed integrally.

An embodiment of the diameter of the outer bearing surface 13 of the ring portion is larger than 20 cm, possibly larger than 30 cm. In the embodiment, a diameter of 41 cm is used.

In the embodiment, the support element 4 is mounted on a casing of a transmission box 3 connecting the crank shaft with the cam shaft and/or secondary power outputs. The transmission box 3 is mounted on one axial side of the engine block 2.

In the embodiment, the engine is a linear engine. The same principle can however also be applied to other engine forms such as V-engines.

In the embodiment, the two half shelves 10 and 11 are formed as cast iron parts.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the recited value or range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A combustion engine comprising a crankshaft and a trunnion mount for mounting the combustion engine to a chassis, the trunnion mount comprising:
    a support element fixedly connected to the engine and having a ring portion with an outer bearing surface that is arranged concentrically around the crankshaft of the combustion engine,
    a shelf having an inner bearing surface for surrounding the outer bearing surface of the support element, the shelf forming a link between the chassis and the combustion engine, and
    a rubber bearing arranged between the inner bearing surface of the shelf and the outer bearing surface of the support element, wherein the rubber bearing comprises an inner metal layer formed by a cylindrical metal sheet,
    wherein the inner metal layer of the rubber bearing formed by the cylindrical metal sheet is axially press-fitted on the outer bearing surface of the support element and contacts the outer bearing surface of the support element around its entire circumference.

2. The method of claim 1, wherein the inner metal layer is formed by a continuous metal band in the circumferential direction.

3. The combustion engine of claim 1, wherein the rubber bearing comprises an axial stop member for abutting with an axial end of the ring portion of the support member.

4. The combustion engine of claim 3, wherein the axial stop member is formed by a metal ring plate connected to the inner metal layer of the rubber bearing and extending inwardly therefrom.

5. The combustion engine of claim 1, wherein the rubber bearing comprises two rubber layers, a middle metal layer arranged between the two rubber layers, and the inner and an outer metal layer, wherein each of the outer metal layer, the inner metal layer, the two rubber layers, and the middle metal layer extend in a circumference around the rubber bearing.

6. The combustion engine of claim 1, wherein the shelf has a lower half shelf comprising a part of the inner bearing surface on an upper surface of the lower half shelf and an upper half shelf comprising a part of the inner bearing surface on a lower surface of the upper half shelf, the upper half shelf being connected to the lower half shelf via one or more screws.

7. The combustion engine of claim 1, wherein the outer bearing surface is cylindrical.

8. A method for mounting a combustion engine to a chassis via a trunnion mount,
    the trunnion mount, comprising:
        a support element fixedly connected and/or connectable to the engine and having a ring portion with an outer bearing surface that is arranged concentrically around the crankshaft of the engine,
        a shelf having an inner bearing surface for surrounding the outer bearing surface of the support element, the shelf forming the link between the chassis and the engine, and
        a rubber bearing arranged between the inner bearing surface of the shelf and the outer bearing surface of the support element, wherein the rubber bearing comprises an inner metal layer formed by a cylindrical metal sheet,
    axially press-fitting the inner metal layer of the rubber bearing formed by the cylindrical metal sheet on the bearing surface of the support element to contact around an entire outer bearing surface of the support element.

9. The method according to claim 8, wherein the rubber bearing comprises at least one rubber layer and/or at least one outer metal layer, wherein the at least one rubber layer and/or at least one outer metal layer have at least one slit extending from a first axial side to a second axial side.

10. The method according to claim 8, wherein the rubber bearing comprises two rubber layers, a middle metal layer arranged between the two rubber layers, and the inner and an outer metal layer, wherein each of the outer metal layer, the inner metal layer, the two rubber layers, and the middle metal layer extend in a circumference around the rubber bearing.

11. The method of claim 10, wherein the rubber layers and/or the middle metal layer and/or the outer metal layer have at least one slit extending from a first axial side to a second axial side, and/or wherein the inner metal layer is formed as a continuous metal band in the circumferential direction.

12. The method according to claim 8, wherein the rubber bearing comprises an axial stop member for abutting with an axial end of the ring portion of the support member.

13. The method of claim 12, wherein the axial stop member is formed by a metal ring plate connected to the inner metal layer of the rubber bearing and extending inwardly therefrom.

14. The method according to claim 8, wherein the rubber bearing is formed separately from the support element and the shelf.

15. The method according to claim 8, wherein the shelf has a lower half shelf comprising a part of the inner bearing surface on an upper surface of the lower half shelf and an upper half shelf comprising a part of the inner bearing surface on a lower surface of the upper half shelf, the method comprising a step of connecting the upper half shelf to the lower half shelf via one or more screws.

16. The method of claim 8, comprising the further step of connecting the engine via the ring portion of the support element to the shelf after axially press-fitting the rubber bearing to the support element.

17. The method of claim 8, comprising the further step of compressing the ring portion and the rubber bearing between a lower and an upper half shelf.

18. The method of claim 8, wherein the outer bearing surface is cylindrical.

19. An apparatus comprising a chassis and a combustion engine, wherein the combustion engine is connected to the chassis by at least one trunnion mount, the at least one trunnion mount, comprising:

a support element fixedly connected and/or connectable to the combustion engine and having a ring portion with an outer bearing surface that is arranged concentrically around a crankshaft of the combustion engine, a shelf having an inner bearing surface for surrounding the outer bearing surface of the support element, the shelf forming the link between the chassis and the engine, and a rubber bearing arranged between the inner bearing surface of the shelf and the outer bearing surface of the support element, wherein the rubber bearing comprises an inner metal layer formed by a cylindrical metal sheet, wherein the inner metal layer of the rubber bearing formed by the cylindrical metal sheet is axially press-fitted on the outer bearing surface of the support element and forms contact around an entire outer bearing surface of the support element.

* * * * *